United States Patent [19]
Hu

[11] Patent Number: 5,939,251
[45] Date of Patent: *Aug. 17, 1999

[54] APPARATUS AND METHOD FOR SIMPLIFYING THE PROCESSES IN CREATING A SEALED SPACE ON SLIDES TO CONDUCT MOLECULAR BIOLOGICAL REACTIONS THEREIN

[76] Inventor: Min Hu, 811 Timlott La., Palo Alto, Calif. 94306-2640

[ * ] Notice: This patent issued on a continued prosecution application filed under 37 CFR 1.53(d), and is subject to the twenty year patent term provisions of 35 U.S.C. 154(a)(2).

[21] Appl. No.: 08/680,324
[22] Filed: Jul. 12, 1996
[51] Int. Cl.⁶ .......................................................... C12Q 1/00
[52] U.S. Cl. .............................. 435/4; 435/30; 435/288.3; 436/174
[58] Field of Search ............................. 422/102; 436/809, 436/174; 435/4, 287.2, 288.3, 288.4, 305.1, 30

[56] References Cited

U.S. PATENT DOCUMENTS

| | | | |
|---|---|---|---|
| 2,942,520 | 6/1960 | Rose | 435/288.3 |
| 5,192,503 | 3/1993 | McGrath et al. | 422/57 |
| 5,518,925 | 5/1996 | Tyndorf et al. | 435/305.2 |
| 5,571,721 | 11/1996 | Turner | 435/305.1 |

FOREIGN PATENT DOCUMENTS

| | | |
|---|---|---|
| 0514017 | 5/1976 | U.S.S.R. . |
| 1659469 | 6/1991 | U.S.S.R. . |

*Primary Examiner*—David A. Redding
*Attorney, Agent, or Firm*—Bo-In Lin

[57] ABSTRACT

The present invention includes an enclosure dam for defining an sealed space between a slide and a covering means for containing a mixture of target samples and reagents for carrying out a molecular biological reaction therein. The enclosure dam a surrounding wall disposed on the slide wherein the surrounding wall composed of resin type of materials sustainable over a range of reaction conditions for the molecular biological reaction, the surrounding wall defining a securely sealed space on the slide in combination with the covering means provided for covering the surrounding wall whereby the molecular biological reaction can be flexibly and conveniently conducted in the sealed space in situ on the slide.

3 Claims, 3 Drawing Sheets

APPARATUS AND METHOD FOR SIMPLIFYING THE PROCESSES IN CREATING A SEALED SPACE ON SLIDES TO CONDUCT MOLECULAR BIOLOGICAL REACTIONS THEREIN

BACKGROUND OF THE INVENTION

1. Field of the Invention

This invention relates generally to apparatus and method for performing a molecular biological reaction, e.g., a polymerase chain reaction (PCR) process. More particularly, this invention relates to an apparatus and method for creating a sealed space by a simplified method and apparatus for performing an in situ PCR on a DNA or RNA sample in the original cell structure by localizing the PCR reaction mixture within a resin circled space on slides to carry out the PCR process on nucleic acid sample such that the PCR process can be more flexibly performed at a lower cost.

2. Description of the Prior Art

For an in situ polymerase chain reaction (PCR), due to the requirement of conducting the thermal cycling processes in a specially sealed space on slides with suitable conditions for DNA amplification, current techniques are still restricted by a limitation that the more costly containment systems specially designed for in situ PCR have to be used in order to satisfy this requirement. Other than the fact the PCR containment systems are more expensive, such containment systems are also inflexible due to its rigid structure. Due to their rigid structure, for those of ordinary skill in the art, under certain circumstances the conventional containment systems are more difficult to apply. Additionally, the sealed space provided by the containment system with rigid structure is fixed and cannot be flexibly changed. As the result of this inflexibility, additional economic penalty may incur under the circumstances in amplifying small volumes of target cells or tissues. Due to the fact that the sealed space is fixed and cannot be reduced, despite the samples are of smaller volume, same amount of enzyme and reagents are still required to fill the sealed space to assure complete amplification processes are performed. Thus the PCR containment systems of rigidly structured as now available causes unnecessary wastes of expensive enzyme and reagents and leads to even higher cost in conducting the PCR amplification process. On the contrary, when the samples are of larger size than the containment systems, due to the fixed size limitation, the in situ PCR amplifications cannot be performed with the containment system unless the samples are further processed for volume reduction.

A segment of double stranded DNA can be amplified by applying a polymerase chain reaction (PCR) process wherein a very large number of faithful copies of the template DNA can be produced. The PCR process is carried out by thermal-cycling of the template DNA in the presence of thermally stable DNA polymerase enzyme which typically is a Taq polymerase, four DNA nucleotide bases and two or more single stranded DNA primers. The PCR techniques are disclosed in several prior U.S. Patents and are commonly practiced by those of ordinary skill in the art of molecular biology and other related fields. Recent advancement in PCR technology enables the PCR processes to be carried out on specific DNA segments inside cells without first extracting DNA from the cells. This in situ PCR processes are typically performed on sample tissues or cells which are fixed by treatment with formalin to be mounted on microscopic slides with the morphology of the sample tissues or cells preserved for recognition after treatment. Thermal cycling are then performed on a mixture of the sample tissues or cells including the target DNA and developer reagents and other PCR reagents attached with label-molecule or DNA-probe also attached with a label molecule. After the post-PCR processing steps are performed after the in situ PCR thermal cycling is completed, a multiple, e.g., $10^6$ to $10^{12}$, copies of the amplified DNA segments in each cell are generated.

During the thermal cycling process, the specimen for amplification covered with PCR reagents containing DNA polymerase enzyme, nucleotides, primers and other components are mounted on a silanized slide. The slide and the reagent mixture are cycled typically from about 50° C. to 95° C. for approximately 20 to 30 times. In order to assure proper conditions for DNA amplification, the concentration of the reagent mixture must be carefully maintained. Prevention of water evaporation from the reagent mixture is required to maintain an optimum reagent concentration such that the PCR operation can be successfully carried out.

Several techniques are being applied to provide a sealed space to carry out the PCR thermal cycling process therein. An early method is to place a cover slip over a sample for amplification and then seal it with nail polish or similar adhesive material. Leakage often occurs in this type of arrangement as the seal provided by the nail polish does not adhere properly to the cover slip. Furthermore, the nail polish seal often cannot sustain the temperature and pressure required for the PCR operation and resulting in a dislodge of the seal thus causing the cover slip to touch the cells and damaging the cell morphology. A more complicated post-PCR process is also required to dissolve the nail polish with a chloroform treatment.

Other techniques involving the application of chambered slides enclosed by gasket and covered with Saran wrap; placing the reagents in an aluminum boat then covered it with polypropylene. Adding the mineral oil on top of the PCR mixture sample to reduce evaporation and condensation is also applied in different PCR amplification processes. However, these techniques rely heavily on the skill of the persons who perform these operations to minimize leaks, control the reactions in the confined space, and to place the slides and the covers in a right position to achieve the desire results. These techniques may be useful and applicable in small scale, however, their results usually cannot be reproducible and therefore are very limited in their usefulness for broader and routine applications where reliable and reproducible results are required.

Atwood et al. disclose in U.S. Pat. No. 5,364,790, entitled "In Situ PCR Amplification System" (issued on Nov. 15, 1994), an in situ PCR system for amplification of nucleic acids contained in a prepared cell or tissue sample. The PCR system 10 is shown in FIGS. 1A and 1B. The PCR amplification system 10 is a containment includes a glass microscope slide 14, a specimen sample 12 containing the target nucleic acid sequence mounted on the slide 14, a flexible plastic cover 16 over the sample 12 and a retaining assembly 28 fastened to the slide 14 and to the cover 16 to retain and seal a reaction mixture 13 against the sample 12 during thermal cycling. The retaining assembly includes a rigid ring 20 on a rim portion 19 of the cover 16, a cross beam 24 having spaced parallel rails joined by opposite flat ends, and a pair of clips 28 which are pressed over the ends and opposite sides of the slide 14 to fasten the cross beam 24 and cover 16 to the slide 14. The cover 16 is retained against the slide 14 and a sealed space is created to contain the reaction mixture during thermal cycling.

Atwood et al. provide a secure and well sealed space for carrying out the PCR amplification process. However, as discussed above, due to the rigid structure of this containment system, difficulties arise in wasting expensive reagents in applying the apparatus to small volumes of samples. As special training is required to follow the operation procedure of the system, a leakage may still occur if specific procedures are not followed carefully. Furthermore, additional costs are involved in applying this technique to PCR amplification due to the fact that the patented containment system, as now marketed and made commercially available, is quite expensive. Also, in order to properly use this system, various consumable items, e.g., clamps, slips, cover slips and particular reagents all have to be purchased from certain suppliers according to the specifications of the containment system. These cost considerations further limit broader and useful PCR applications.

An alternate reaction containment system is provided in a "Winter 1996 Catalog" published by PGC Scientific. As shown in FIG. 2, a removable, self adhesive chamber enclosing a 15 mm diameter specimen area on a microscope slide to control evaporation for in situ DNA amplification during thermal cycling on microscope slides is disclosed by PGC Scientific. The chamber defines a cone shaped space which is composed of materials that is heat set adhesive to securely attach to the slide. A fixed amount of reagents may be added followed by a self-adhesive top seal which is flexible to minimize the internal pressure changes. Even that this cone-chamber made of self adhesive materials are simpler and more convenient to apply than the containment system disclosed by Atwood et al. as now available in the market, however, the chamber is still limited by a fixed volume. In the same Catalog, other types of "chambers" and "wells" are disclosed which employ pre-formed adhesive "Probe-Clip" to provide a sealed space. Again, these types of apparatuses are limited by the rigid structure and fixed volume which is pre-defined by the structure of the chambers or wells. The limitations due to the inflexibility in changing the volumes contained by the sealed space are not resolved by the techniques provided by PGC Scientific.

Therefore, a need still exists in the art of apparatus and operation technique of molecular biological processing to provide an appropriate seal-materials and structural configuration to provide a sealed space suitable for thermal cycling operations and post-thermal cycling treatment in removing the seal materials such that processes involving molecular biological reactions such as PCR can be more economically and flexibly performed.

SUMMARY OF THE PRESENT INVENTION

It is therefore an object of the present invention to provide new techniques including materials and method for creating a sealed space on slides for carrying molecular biological reactions therein thus enabling those of ordinary skill in the art to overcome the aforementioned difficulties and limitations encountered in the prior art.

Specifically, it is an object of the present invention to provide new methods and materials such as resin for defining a sealed space for carrying out certain molecular biological reactions therein such that the reactions can be flexibly and economically performed without requiring tailor-made devices specifically designed for the designated molecular biological reactions.

Another object of the present invention is to provide new techniques employing new types of enclosure materials such as resins for defining a sealed space for carrying out certain molecular biological reactions therein where a stable and secure sealed space is provided by the enclosure materials which have stable enclosure characteristics sustainable over the entire ranges of temperature and pressure such that the sealed space can be properly maintained and inadvertent leaks can be reduced.

Another object of the present invention is to provide new techniques employing new types of materials such as resins for flexibly defining a sealed space for carrying out certain molecular biological reactions therein such that wastes of expensive reagents required for the reactions can be reduced because the sealed space can be more conveniently reconfigured depending on the volume of the reaction samples and the space necessary for carrying out each reaction.

Another object of the present invention is to provide new techniques employing new types of enclosure materials such as resins for defining a sealed space for carrying out certain molecular biological reactions therein where the enclosure materials can be conveniently and safely removed after completion of the reactions such that the main purposes of the reactions can be achieved without being limited by difficulties caused by post-reaction processes.

Another object of the present invention is to provide new techniques employing new types of enclosure materials such as resins for defining a sealed space for carrying out certain molecular biological reactions therein where a secure and flexible sealed configuration is created such that large number of the same type of sealed spaces can be conveniently provided and detection processes during and after the reactions can be flexibly carried out without being limited by the concerns that leakage or breaks of the sealed spaces may occur in conducting the detection or reaction processes.

Briefly, in a preferred embodiment, the present invention includes an enclosure means for defining an in situ sealed space between a slide and a covering means for containing a mixture of target samples and reagents therein. The enclosure means includes a surrounding wall disposed on the slide wherein the surrounding wall composed of resin type of materials sustainable over a range of reaction conditions for a target molecular biological reaction. The surrounding wall defines a securely sealed space on the slide in combination with the covering means provided for covering over the surrounding wall whereby the target molecular biological reaction can be flexibly and conveniently conducted in the in situ sealed space.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1A:
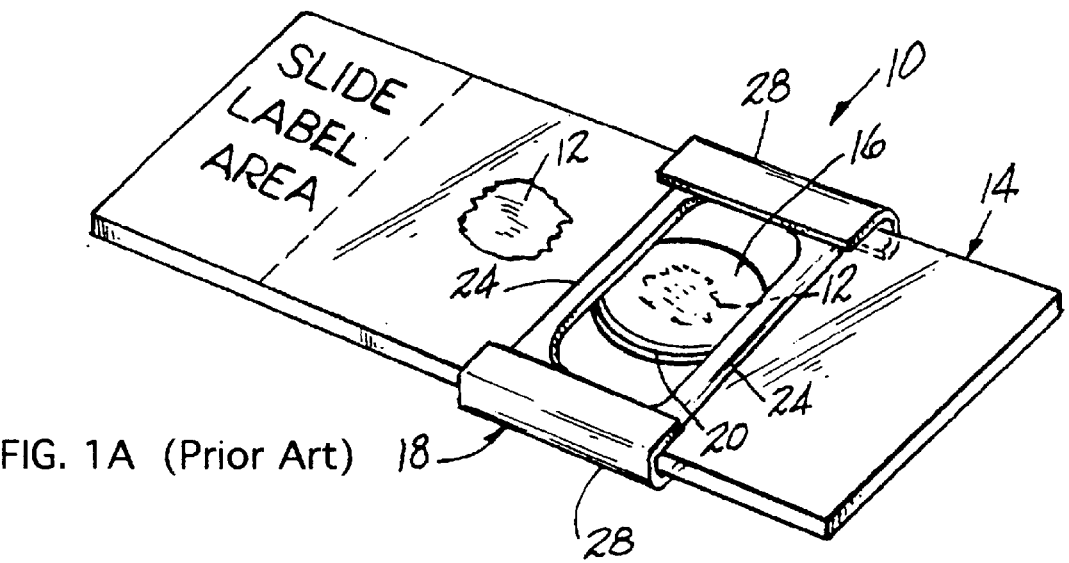
FIGS. 1A and 1B are partial perspective view showing the structure of a PCR containment system employed in the prior art.
Figure 1B:
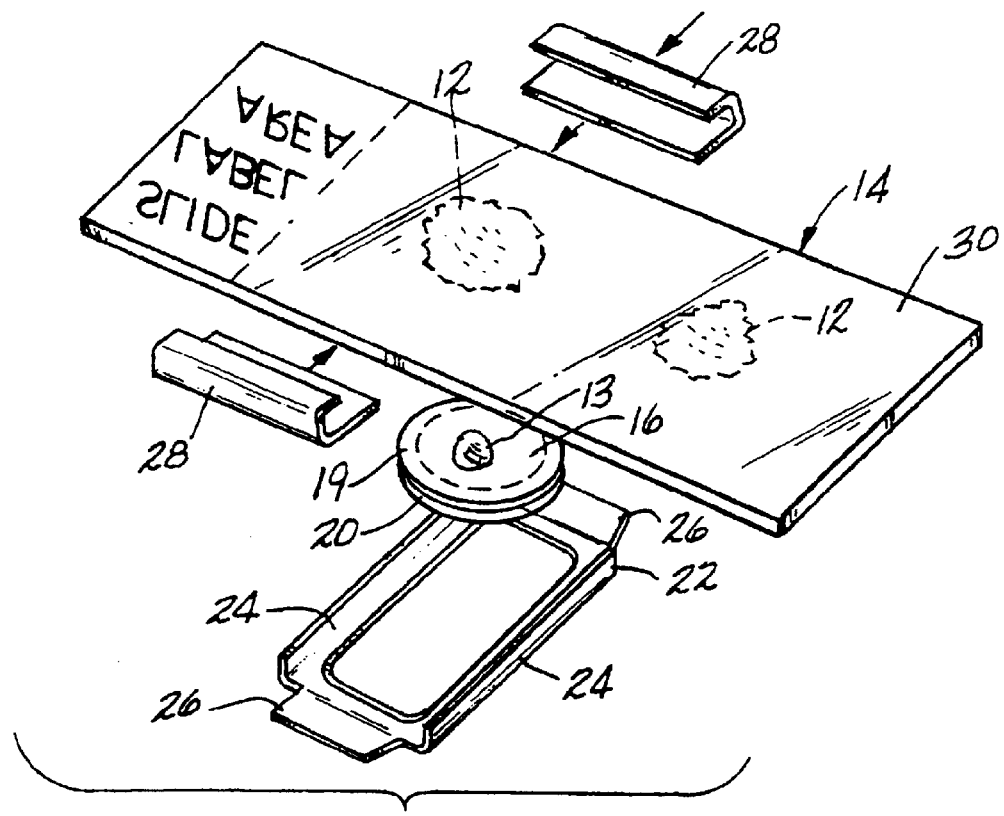
Figure 2:
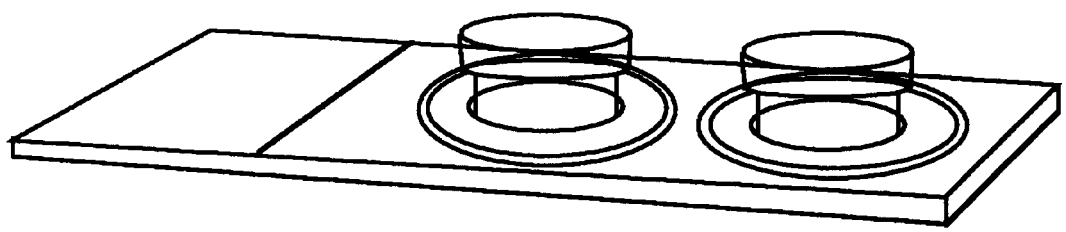
FIG. 2 is another partial perspective view showing the structure of a different PCR containment system employed in another prior art device.
Figure 4:
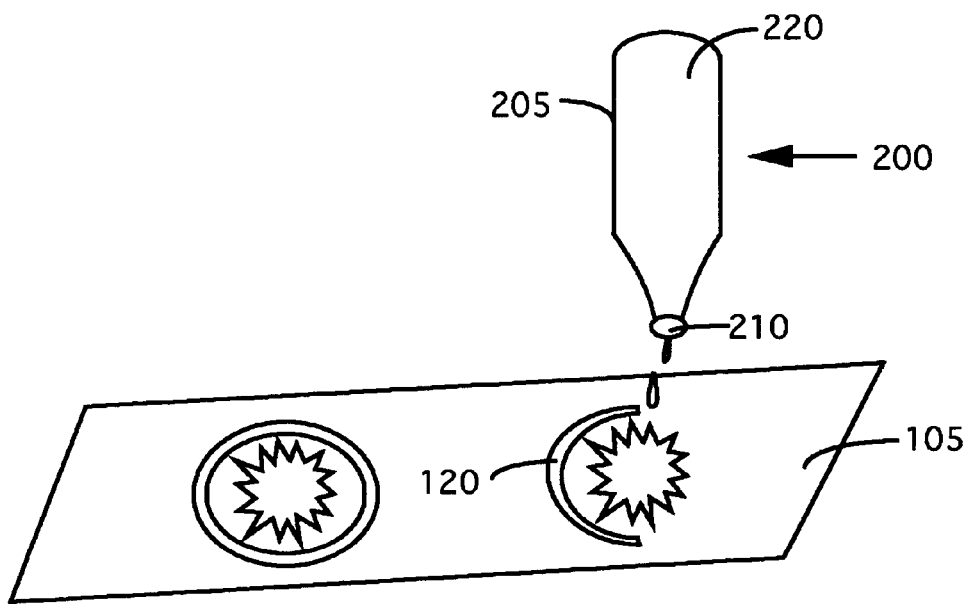
FIG. 4 is a perspective view of the process carried out in forming the surrounding dam of FIGS. 3A and 3B.
Figure 3A:
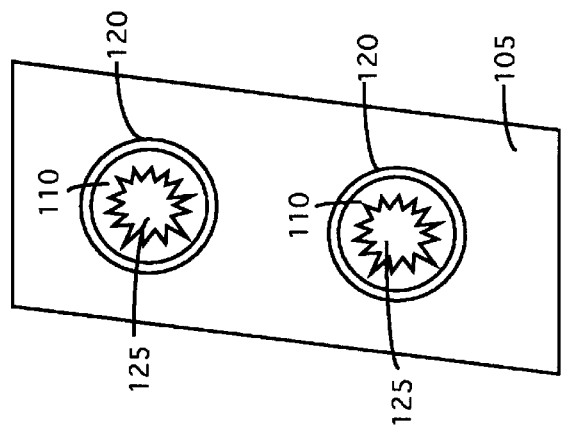
FIGS. 3A to 3B show a top view and a cross sectional views respectively of a PCR reaction well enclosed by a surrounding dam of the present invention.
Figure 3B:
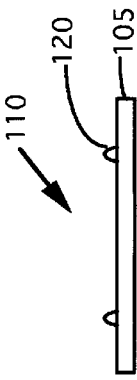

Please refer to FIGS. 3A and 3B for a top view and a cross sectional views of a PCR reaction well 110 enclosed by a surrounding dam 120 mounted on a tissue slide 105. On the top surface of the slide 105, inside the surrounding dam 120, are specimen of paraffinized or frozen tissues or cell-suspension 125. The surrounding dam 120 is formed by the use of common mounting media which can be either synthetic resins, natural resins or other resin-like materials or products, or gum-type materials. Resins can be made as mounting media such as Fisher Prmount Mounting Medium produced by Fisher Scientific Co., Pro-Texx by American Scientific Products, S/P ACCUM Mount-60 by Baxter Scientific Products or Cytoseal-60 by Stephens Scientific Co. Please refer to FIG. 4 for a perspective view of the process carried out in forming the surrounding dam 120. An elongate tube 200 with a thin opening tip 210 at the bottom and an elongated chamber 220 at the top which is formed by a resin containing and squeezing shell 225 is employed. The resin which is used to forming the dam 120 is stored in the elongated chamber 220 mixed with organic solvent such as xylene, toluene, alcohol, etc. The organic solvent is highly volatile, such that the mixture is formed as a soft resin-paste and when the organic solvent is volatilized, the resin type of materials solidified and become a firm surrounding dam 120. A surrounding dam 120 can be flexibly formed by asserting a pressure to the resin-paste containing and squeezing shell 225 to squeeze the resin to flow from the opening tip 210 onto the microscopic slide 105. This formation process of the surrounding dam 120 can be carried out by the use of the elongated tube 200 at a normal room temperature and pressure without special added procedural requirements. The dam 120 can be formed with a thickness of approximately a one-tenth to two millimeters with a height of one to five millimeters. The thickness, height, size, and shape defined by the surrounding dam 120 can be controlled by properly asserting a squeezing pressure to the resin containing and squeezing shell 225 and by guiding the tube 200 along the boundary surrounding the specimen of paraffinized or frozen tissues or cell-suspension 125 mounted on the microscopic slide 105. This elongated tube 120 can be any type of dam-forming means such as a pen or other device which can either be controlled by hand, other mechanical or electrical methods or automated to be controlled by a computer to properly form the surrounding dam 120 on the slide 105. Depending on the size, shape and configurations of the tissues or cells 125, the surrounding dam 120 can be flexibly formed to best suit the situations such that the required molecular biological reactions can be optimally performed in a seal space partly defined by the surrounding dam 120.

Figure 5A:
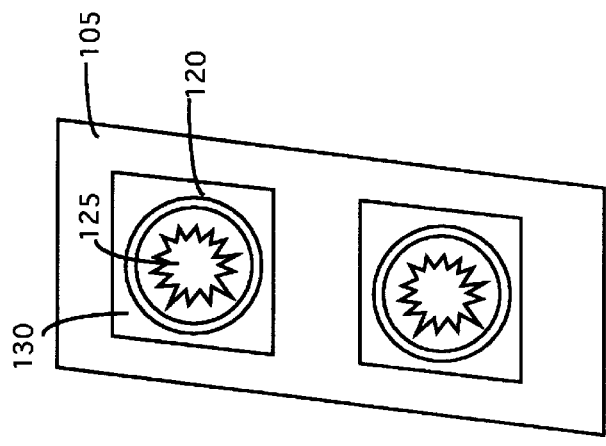
FIGS. 5A and 5B show the top view and cross section view respectively of a glass cover covering the reaction well.
Figure 5B:
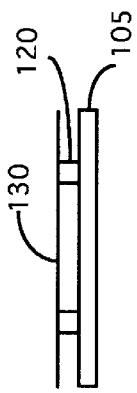

After the formation of the surrounding dam 120 by applying the elongated tube 200, the newly formed dam 120 is placed together with the microscopic slide 105 under a hood for five to twenty minutes for the organic solvent in the resin mixture to volatize and a solidified wall is formed as the surrounding dam 120 around the tissue or cell 125 on the slide 105. A mixture of PCR reagents is added into the space formed by the surrounding dam 120. The added mixture typically has a volume of approximately 20 μl and can range from five to forty-five μl. After the well 110 is filled with PCR reagents, a cover-slip 130 which is typically a glass cover, is employed to cover the reaction well 110 as that shown in FIGS. 5A and 5B. By asserting a downward pressure on the cover slip 130, it is securely attached to the surrounding dam 120 because of the natural adhesiveness of the resin to the glass. A sealed space enclosed within the surrounding wall 120, the slide 105 and the cover-slip 130 is formed.

Figure 6:
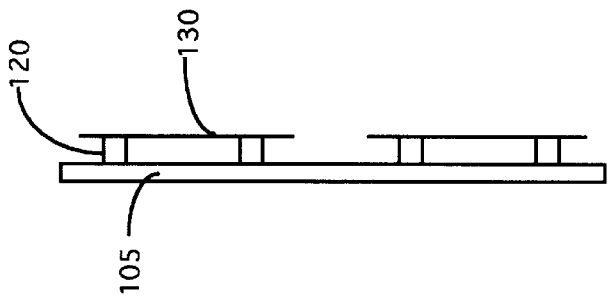
FIGS. 6A and 6B show that the slide can be placed and stored in a vertical position to achieve space saving in performing the thermal cycling operations.

Once the cover-slip 130 is securely attached to the surrounding dam 140 composed of resins, the entire slide 105 together with the PCR reagent mixture now sealed in the reaction well 110. After settling for five to ten minutes, the slide 105 together with the sealed reaction well 110 disposed thereon can now be placed in any position without concerning spilling out or leaking from the reaction well 120 because the cover-slip 130 is tightly sticking to the surrounding dam 110. As shown in FIG. 6, the slide 105 can be placed and stored in a vertical position to achieve space saving in performing the thermal cycling operations. Since the resin has a high softening temperature around 155° C., the reaction wells 110 sealed by the surrounding dam 120 can sustain up and down thermal cycling process which has a temperature between 4° up to 95° C. The microscopic slide 105 with the sealed reaction well 110 enclosed by the dam 120 and covered under the cover slip 130 can be conveniently placed in a commercially available system, e.g., a GeneAmp In Situ PCR System 1000 by Perkin Elmer, for carrying out a thermal cycling operation to perform the in situ PCR amplification processes.

After the thermal cycling operations are performed with the target DNA contained in tissue or cell 125 are amplified, an organic solvent such as xylene can be applied for a duration of approximately ten minutes to resolve the resin. The cover slip can be easily removed once the surrounding dam 120 composed of resin is resolved in xylene. Further processes of identifying the amplified DNA or RNA as generally performed in a PCR process are then carried out after the dam 120 and the cover slip are removed.

The present invention discloses an enclosure means for defining an sealed space between a slide 105 and a covering means 130 for containing a mixture of target samples and reagents 125 for carrying out a molecular biological reaction therein. The enclosure means includes a surrounding wall 120 disposed on the slide 105 wherein the surrounding wall 120 is composed of resin type of materials sustainable over a range of reaction conditions for the molecular biological reaction, the surrounding wall 120 defining a securely sealed space on the slide 105 in combination with the covering means 130 provided for covering the surrounding wall 120 whereby the molecular biological reaction can be flexibly and conveniently conducted in the sealed space 110. In a preferred embodiment, the resin type of materials are further dissolvable in a subsequent processing step on the mixture of target samples and reagents whereby further processes of the mixture of target samples and reagents may be conveniently conducted.

The present invention also discloses a method for carrying out a molecular biological reaction in a sealed space between a slide 105 and a covering means 130. The method includes the steps of (a) forming a surrounding wall 120 on the slide 105 with a resin type of materials sustainable over a range of reaction conditions for the molecular biological reaction; and (b) defining the sealed space by tightly covering the surrounding wall 120 with the covering means 130 for containing a mixture of target samples and reagents 125 for carrying out the molecular biological reaction in the sealed space 110. In a preferred embodiment, the step (a) of forming a surrounding wall 120 on the slide 105 with a resin type of materials is a step of applying an elongated mounting-medium-containing tube 200 with a lower end wall-forming opening 210 to deposit the resin type of materials flowing down from the elongate mountingmedium-containing tube 200 via the wall-forming opening 210 onto the slide 105.

In addition to the PCR amplification process as described above, the sealed space generated by the use of the surrounding wall by the use of resin type of materials can also be employed for other types of molecular biological reactions such as in situ hybridization. Briefly, a tissue section including the target nucleotide is first processed by HCl, and phosphate buffer salt (PBS). They are then digested with protease and fixed in 4% paraformaldehyde. After graded alcohol dehydration, hybridization reagents are added which contains a probe is labeled with a radioactive, such as $^{35}S$, or a non-radioactive, e.g., digoxigenin. The mixtures are enclosed in a surrounding wall of the present invention which is then covered with a slip to generate a sealed space for carrying out the hybridization reactions without evaporation of the liquid mixtures. The hybridization process is carried out at a temperature of 42° C. for twelve to eighteen hours in the sealed space. After extensive washing the SSC buffer, the target nucleotides which are hybridized to the digoxigenin-labeled probe are detected by an anti-digoxigenin antibody and developed with 5-brom-4-chloro-3-indolyl phosphate/nitro blue tetrazolium. Alternately, for the nucleotides which are labeled with radioactive probes are latered with auto-radiographic emulsion and developed after two weeks of exposure. The samples are rinsed with tris buffer and counter-stained and then mounted. For the purpose of hybridization, the surrounding wall formed with resin type of materials of the present invention also provides special advantages of flexibility, ease of use, low cost and non-leaking seal such that the molecular biological reactions can be conveniently and reliably carried out.

The present invention thus provides a new techniques including materials and method for creating a sealed space for carrying molecular biological reactions therein. Those of ordinary skill in the art are enabled to overcome the difficulties and limitations encountered in the prior art. Specifically, the present invention disclose new methods and materials, e.g., resin, for defining a sealed space for carrying out certain molecular biological reactions therein such that the reactions can be flexibly and economically performed without requiring tailor-made devices specifically designed for the designated molecular biological reactions. The sealed materials and techniques created a stable and secure sealed space which has stable enclosure characteristics sustainable over the entire ranges of temperature and pressure such that the sealed space can be properly maintained and inadvertent leaks can be reduced. The techniques as disclosed can flexibly define a sealed space for carrying out certain molecular biological reactions therein such that wastes of expensive reagents required for the reactions can be reduced because the sealed space can be more conveniently reconfigured depending on the volume of the reaction samples and the space necessary for carrying out each reaction. Furthermore, the enclosure materials can be conveniently and safely removed after completion of the reactions such that the main purposes of the reactions can be achieved without being limited by difficulties caused by post-reaction processes. Because that a secure and flexible sealed configuration is created, large number of the same type of sealed spaces can be conveniently and simultaneously provided and the amplification and detection processes during and after the reactions can be flexibly carried out without being limited by the concerns that leakage or breaks of the sealed spaces may occur in conducting the detection or reaction processes.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A method for carrying out a molecular biological reaction in a sealed space between a slide with target samples and reagents disposed thereon and a covering means, said method comprising steps of:

(a) forming a surrounding dam on said slide by disposing a gel-type paste surrounding said target samples and reagents on said slide followed by volatizing and solidifying said gel-type paste thus forming said surrounding dam.

2. The method for carrying out a molecular biological reaction of claim 1 wherein:

said step (a) of disposing said gel-type paste on said slide is a step of applying a containing means for containing said gel-type paste with a lower end opening to deposit said gel-tape paste flowing down from said containing means via said lower-end opening onto said slide for disposing said gel-type paste surrounding said target samples and reagents.

3. The method for carrying out a molecular biological reaction of claim 1 further comprising:

(b) defining said sealed space by tightly covering said surrounding dam with said covering means for containing a mixture of said target samples and reagents for carrying out said molecular biological reaction in said sealed space.

* * * * *